United States Patent [19]

Karouji

[11] Patent Number: 5,751,912
[45] Date of Patent: May 12, 1998

[54] SCHEMATIC DIAGRAM CREATING SYSTEM

[75] Inventor: Yasuhito Karouji, Tokorozawa, Japan

[73] Assignee: Kabushiki Kaisha Toshiba, Kawasaki, Japan

[21] Appl. No.: 722,203
[22] PCT Filed: Feb. 16, 1996
[86] PCT No.: PCT/JP96/00332
§ 371 Date: Oct. 15, 1996
§ 102(e) Date: Oct. 15, 1996

[30] Foreign Application Priority Data

Feb. 16, 1995 [JP] Japan .................................. 7-027978

[51] Int. Cl.⁶ .................................................. G06F 15/18
[52] U.S. Cl. ........................................... 395/62; 395/60
[58] Field of Search .................................. 364/900, 200; 395/100, 62, 60, 61, 50–51, 10–13

[56] References Cited

U.S. PATENT DOCUMENTS

| 4,539,653 | 9/1985 | Bartlett et al. | 364/900 |
| 5,146,672 | 9/1992 | Suzuki | 395/100 |

FOREIGN PATENT DOCUMENTS

| 2-148363 | 6/1990 | Japan . |
| 4-25972  | 1/1992 | Japan . |
| 6-180604 | 6/1994 | Japan . |

OTHER PUBLICATIONS

Frezza et al. "A SPAR: A Schematic Place and Route System," IEEE Trans. on Computer Aided Design of Integrated Circuits and Systems, vol. 12, No. 7, pp. 956–973, Jul. 31, 1993.

Primary Examiner—Tariq R. Hafiz
Attorney, Agent, or Firm—Finnegan, Henderson, Farabow, Garrett & Dunner, L.L.P.

[57] ABSTRACT

A schematic diagram creating system creates schematic diagrams associated with a control apparatus on the basis of a plurality of specification data with an input/output relation between each kind of devices in the control apparatus and each kind of devices in an external or internal apparatus being listed in signal units, in which it comprises a sorting section (13) for sorting the specification data for each device corresponding to that in the control apparatus, a basic drawing selecting section (14) for selecting the basic diagram data corresponding to the specification data for each device sorted by the sorting section, an arranging section (15) for arranging, in accordance with predetermined rules, the specification data for each device sorted by the sorting section, a sheet number setting section (16) for attaching a sheet number to the corresponding specification data for each device sorted by the sorting section, a deciding section (17) for, based on the specification data for each of the devices sorted by the sorting section, deciding a connection relation for each device between the corresponding device in the control apparatus and other devices, and a diagram creation executing section (18) for creating a circuit diagram on the basis of the connection relation decided by the deciding section and corresponding specification data.

8 Claims, 5 Drawing Sheets

ONE FORM OF INPUT/OUTPUT SIGNAL SPECIFICATION DATA

| CONTROL APPARATUS MARK | CARD NUMBER | CARD TYPE | BIT NUMBER | SIGNAL NAME | APPARATUS MARK | DEVICE SYMBOL | DEVICE TYPE | KIND OF CONTACTS | KIND OF DEVICES |
|---|---|---|---|---|---|---|---|---|---|
| PANEL-A | 1001DI | CARD-5 | 0 | UPPER LIMIT DETECTION | MACHINE-1 | SENSOR-11 | SEN-1 | NORMALLY OPEN | LS |
| PANEL-A | 1001DI | CARD-5 | 1 | LOWER LIMIT DETECTION | MACHINE-1 | SENSOR-12 | SEN-1 | NORMALLY OPEN | LS |
| PANEL-A | 1001DI | CARD-5 | 2 | INJECTION DETECTION | MACHINE-2 | SENSOR-21 | SEN-2 | NORMALLY OPEN | LS |
| PANEL-A | 1001DI | CARD-5 | 3 | PASSEGE DETECTION | MACHINE-3 | SENSOR-31 | SEN-2 | NORMALLY OPEN | LS |
| PANEL-A | 1001DI | CARD-2 | 0 | FIRST PUMP OPERATION | DESK-1 | PBS-1 | PB-1010G | NORMALLY OPEN | PB |
| PANEL-A | 1001DI | CARD-2 | 1 | FIRST PUMP STOPPING | DESK-1 | PBS-2 | PB-1010R | NORMALLY OPEN | PB |
| PANEL-A | 1001DI | CARD-2 | 2 | SECOND PUMP OPERATION | DESK-1 | PBS-3 | PB-1010G | NORMALLY OPEN | PB |
| PANEL-A | 1001DI | CARD-2 | 3 | SECOND PUMP STOPPING | DESK-1 | PBS-4 | PB-1010R | NORMALLY CLOSED | PB |

ONE FORM OF DATA
SORTING RULE

| CARD DEVICE ≠ |

FIG. 3

ONE FORM BASIC
DIAGRAM SELECTION RULE

| CARD-1 | FILE001 |
|--------|---------|
| CARD-2 | FILE012 |
| CARD-3 | FILE013 |
| CARD-4 | FILE014 |
| CARD-5 | FILE015 |
| CARD-6 | FILE016 |
| CARD-7 | FILE017 |
| CARD-8 | FILE018 |

FIG. 4

ONE FORM OF ASSOCIATED
DIAGRAM SELECTION RULE

| INVERTER1 | FILE001 |
|-----------|---------|
| INVERTER2 | FILE002 |
| INVERTER3 | FILE003 |
| INVERTER4 | FILE004 |

FIG. 9

ONE FORM OF SHEET
ARRANGING RULE

| CARD-5:DEVICE |
|---------------|
| CARD-1:DEVICE |
| CARD-2:DEVICE |
| CARD-3:DEVICE |
| CARD-4:DEVICE |
| CARD-8:DEVICE |
| CARD-6:DEVICE |
| CARD-7:DEVICE |
| INVERTER1:TO PNL |
| INVERTER2:TO PNL |
| INVERTER3:TO PNL |

FIG. 5

ONE FORM OF SHEET
NUMBER SETTING RULE

```
%START SHEET=101
{ CARD TYPE ≠
   %EMP SHEET=25%
}
 {INVERTER TYPE ≠
    %EMP SHEET=5
}
```

FIG. 6

ONE FORM OF CIRCUIT DIAGRAM
DECIDING RULE

```
# INTERNAL/EXTERNAL DECISION
   {MY PNL≠TO PNL
     %PATERN=CIRNO 11
     {TO PNL=PRE PNL
       %PATERN=CIRNO12
     }
   }
# BIND-OF-CONTACT DECISION
   {TO TYPE=LS
     {TO CON=CLOSED
       %SMBL=LS A001}
     {TO CON=OPEN
       %SMBL=LS B001}
   }
```

FIG. 7

ONE FORM OF DIAGRAM CONTENTS
DECIDING RULE

```
# DIAGRAM TITLE DECISION
   {ALL PARTS=LS
     %TITLE=LIMIT SWITCH INPUT}
   {ALL PARTS=SEN
     %TITLE=SENSOR INPUT}
   {ALL PARTS=MIX
     %TITLE=DIGITAL INPUT}
       .
       .
# LINE NUMBER DECISION
   {BIT=0
     %WIRE NO=HF}
   {BIT=1
     %WIRE NO=HG}
       .
       .
```

SCHEMATIC DIAGRAM CREATING SYSTEM

TECHNICAL FIELD

The present invention relates to a schematic diagram creating system and, in particular, a schematic diagram creating system for creating a schematic diagram expressing, in a plurality of sheets, an electrical interconnection relation of a control panel and the like, for the control of a panel in each of various kinds of industries.

BACKGROUND ART

Generally, the schematic diagram expressed in a plurality of sheets is used as a circuit diagram for grasping the electrical interconnection relation of a control apparatus (e.g., a control panel) for the control of a plant in various kinds of industry. The schematic diagram shows the detail of an input/output relationship concerning various kinds of signals passed among power supply circuits, control circuits, (e.g., a card) equipped with various input/output signal processing functions, and devices in external apparatuses. In such schematic diagram system, for example, the input/output relation is shown, as a circuit diagram on a one-card-per-sheet basis, for an input/output signal processing function.

For the control panel, for example, for performing control in the plant in various kinds of industry, various kinds of specifications are prepared, such as a corresponding control, an operation, an input/output signal, etc., specification. In the input/output signal specification, in particular, the data on a vast amount of signals of various kinds passed in the control panel are arranged from an upper to a lower area. These items of data are composed, in detail, together with the kind, input designation, output designation, etc., of associated signals.

Based on the vast amount of data described on the input/output signal specification, etc., the composer of the schematic diagram has to, while adding predetermined design rules and know-how to the data, complete a schematic diagram on one control panel.

The composing procedure of the schematic diagram on the input/output signal processing, being explained in more detail, is as follows. First, the composer prints out, in a list format for instance, the input/output signal specification data held in a memory medium or the like. Thereafter, he or she sorts various kinds of input/output signals while reviewing the printed-out data. That is, he or she examines to which cards the various kinds of input/output signals in the list are matched and arranged the data of the input/output signals into the corresponding cards.

When the sorting of the various kinds of input/output signals is completed, the composer prepares a requisite number of sheets with a basic drawing described thereon, that is, the drawing (having no detailed circuits, signal names, etc., described thereon) serving as a basis of circuit diagrams. Where there are various kinds of unprinted sheets for preparing the basic drawings, the basic drawings are effectively prepared by the copying of the drawings on the unprinted sheets with the use of a copying machine.

Based on the input/output signal specification and design rules, the composer judges or reads out, from the input/output signal specification, the circuit patterns representing the connection and route between the respective cards and the external devices, the names of the input/output signals, the signs of the associated devices, etc., and writes these items of information on the basic drawings. By doing so, the hand-written schematic diagram sheets are prepared on a per-card(per sheet) basis.

Thereafter, in order to compose such schematic diagrams in book form, the associated diagram sheets are arranged and the sheet numbers are allocated to the diagram sheets. In this case, in order to enable the insertion of any additional diagram sheets between given sheets thereafter, consecutive numbers are not always given, under this consideration, from a first to a last diagram sheet.

Further, in order to provide a formal schematic diagram, the circuit diagrams are prepared, sheet by sheet, on an interactive type CAD (computer-aided design) system and done so, by an input unit, such as a keyboard or a mouse, in accordance with the handwritten diagram sheets.

In this way, a plurality of circuit diagrams are prepared and, by doing so, schematic diagrams are completed in book form.

In such a conventional preparing method, however, human intervention is necessarily required between the operations at each stage and the data conversion and data input operation have to be done manually, thus taking much time in these operations.

Further, since the input/output signal specification has its contents not fixed depending upon an apparatus to be controlled, as well as upon a customer, it is necessary to prepare a vast amount of associated drawings, taking all patterns into consideration. Even if this is possible, a great deal more time is needed, thus encountering a difficulty in actual practice.

Where it is necessary to prepare not only a normal circuit diagram based on the input/output signal specification data but also the associated circuit diagrams based on the input/output signal specification, the requisite associated circuit diagrams have to be searched and, in addition, it is also necessary to provide and use an associated copying machine. At that time, a great deal more sheets are required and a lot of time is required with the resultant lowered operation efficiency.

In order to achieve the automated creation of a schematic diagram with these in mind, it may be possible to use the procedure for its automated creation through the use of the programming function of a CAD system. Even in this case, it is necessary to newly input, through a keyboard or the like, to the CAD system, the diagram creation conditions, as well as all the parameters of the associated data, for executing an automated "diagram-creating function" command. This takes more human-intervention areas, thus posing a problem.

DISCLOSURE OF INVENTION

It is an object of the present invention to provide a schematic diagram creating system which can readily create schematic diagrams.

It is another object of the present invention to provide a schematic diagram creating system which can automatically create schematic diagrams.

It is still another object of the present invention to provide a schematic diagram creating system which can create schematic diagrams with an improved operation efficiency.

It is yet still another object of the present invention to provide a schematic diagram creating system which can create schematic diagrams with a general uniformity.

According to one aspect of the present invention there is provided a schematic diagram creating system for creating schematic diagrams associated with a control apparatus on the basis of a plurality of specification data with an input/output relation between each kind of devices in the control apparatus and each kind of devices in an external or internal apparatus being listed in signal units, the system comprising sorting means for sorting the specification data for each device corresponding to that in the control apparatus; basic diagram selecting means for selecting basic diagram data corresponding to the specification data for each device sorted by the sorting means; arranging means for arranging, in accordance with predetermined rules, the specification data for each device sorted by the sorting means; sheet number setting means for attaching a sheet number to the corresponding specification data for each device sorted by the sorting means; deciding means for, based on the specification data for each of the devices sorted by the sorting means, deciding a connection relation for each device between the corresponding device in the control apparatus and other devices; and diagram creation executing means for creating a circuit diagram on the basic diagram data for each device on the basis of the connection relation decided by the deciding means and the corresponding specification data.

In the above-mentioned schematic diagram creating system, the drawing creation executing means may include means for drawing character information on the basic diagram data at predetermined places. In this case, the diagram creation executing means may include means for drawing a diagram title on the basic diagram at predetermined places. Further, the diagram creation executing means may include means for drawing line numbers on the basic diagram at predetermined places.

In the above-mentioned schematic diagram creating system the sheet number setting means may include means for attaching consecutive sheet numbers to the specification data in an order in which the specification data are arranged by the arranging means. In this case, the sheet number setting means may include means for, when the type of device corresponding to the specification data arranged by the arranging means is changed, securing blank sheet numbers and then attaching the following sheet number.

Further, the arranging means may include means for storing data for defining an arranging order.

According to a second aspect of the present invention, there is provided a schematic diagram creating system for creating schematic diagrams associated with a control apparatus on the basis of a plurality of specification data with an input/output relation between each kind of devices in the control apparatus and each kind of devices in an external apparatus being listed in signal units, the system comprising sorting means for sorting the specification data for each device corresponding to that in the control apparatus; basic diagram selecting means for selecting basic diagram data corresponding to the specification data for each device sorted by the sorting means; associated diagram selecting means for selecting associated diagram data associated with the basic diagram data; arranging means for arranging, in accordance with predetermined rules, the specification data for each device sorted by the sorting means and associated diagram data; sheet number setting means for attaching a sheet number to the corresponding specification data arranged by the arranging means and associated diagram data; deciding means for, based on the specification data for each of the devices sorted by the sorting means, deciding a connection relation for each device between the corresponding device in the control apparatus and other devices; diagram creation executing means for creating a circuit diagram on the basic diagram data for each device on the basis of the connection relation decided by the deciding means and corresponding specification data; and means for creating predetermined data on the associated diagram data.

BEST MODE OF CARRYING OUT THE INVENTION

One embodiment of the present invention will be explained below with reference to the drawings.

Figure 1:
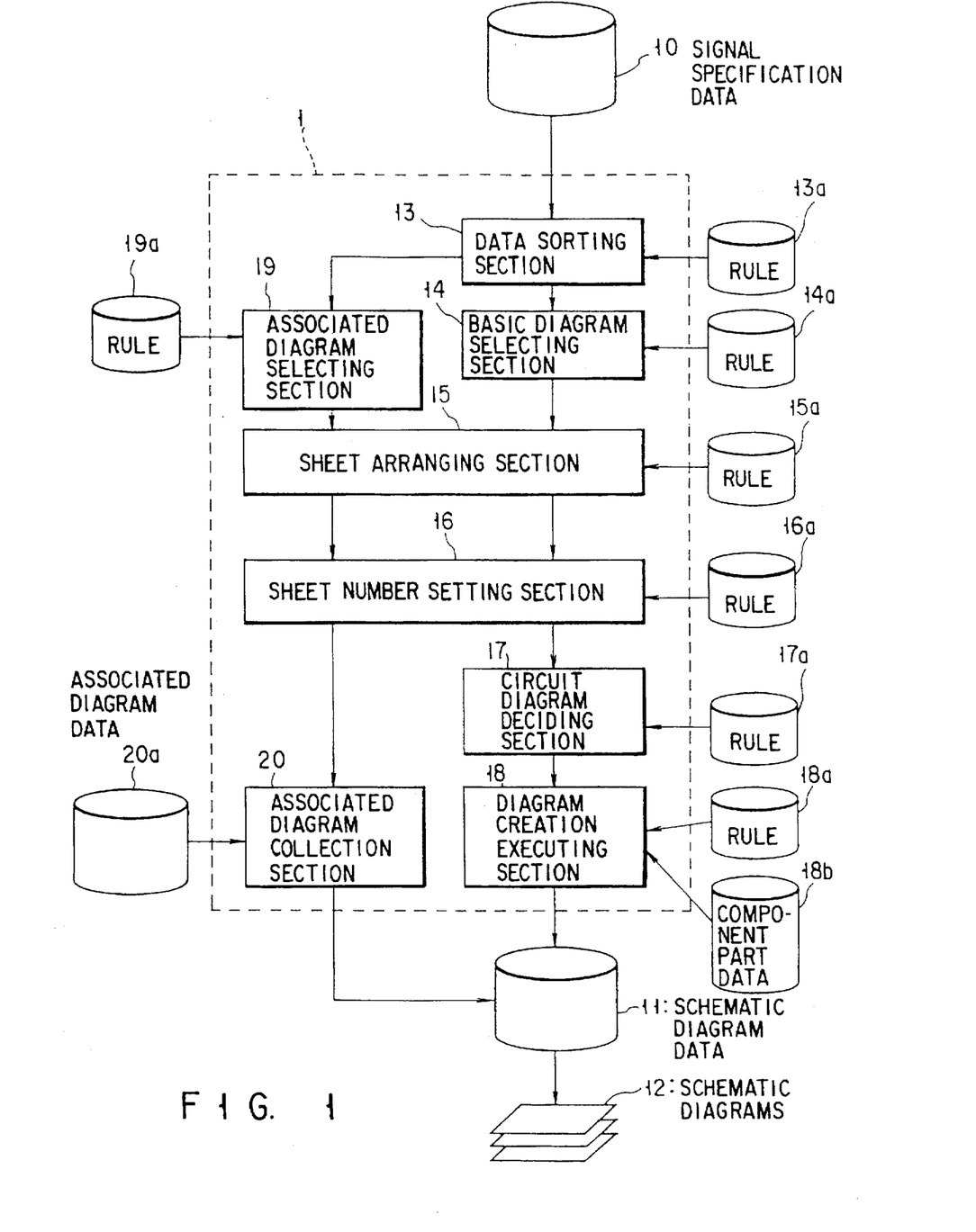
FIG. 1 is a block diagram showing a general arrangement of a schematic diagram creating system according to one embodiment of the present invention.

FIG. 1 is a block diagram showing a whole structure of a schematic diagram creating system according to one embodiment of the present invention.

The schematic diagram creating system according to the present invention is realized by a software program executed on a computer system comprising a computer and memory device. FIG. 1 shows various kinds of processing by its program.

As shown in FIG. 1, a schematic diagram creation processing section 1 is provided on a schematic diagram creating system to perform various kinds of processing for creating a schematic diagram. This schematic diagram creation processing section 1 performs various kinds of processing based on input/output signal specification data stored in a memory section 10 and produces diagram creating data (schematic diagram) necessary to create diagram drawing data (schematic data).

The input/output signal specification data is stored in the memory section 10. The input/output signal specification data shows a detail of the input/output relation among various kinds of signals passed, in a predetermined control panel, between cards equipped with various kinds of input/output signal processing functions and assorted external or internal apparatus. In the input/output signal specification data there are listed up, in signal units, the data items indicative of such an input/output relation. These data items contain signal information by kind, by input destination, by output destination, or the like.

A memory section 11 is provided for storing created data on the schematic diagram. The schematic diagram data stored in the memory section 11 is used for final printout. It is to be noted that the schematic diagram 12 created is comprised of a plurality of sheets and that the input/output relation is drawn as a circuit diagram on a one-card-per-sheet basis.

A data sorting section 13 in the schematic diagram creation processing section 1 sorts the above-mentioned input/output signal specification data, in card units, in accordance with a data sorting rule. A memory section 13a stores data defining a data sorting rule necessary for processing by the data sorting section 13. The data sorting rule is for sorting the data items in various kinds of data in card units.

A basic diagram selecting section 14 selects a basic diagram corresponding to the format of various kinds of cards in accordance with a basic diagram selecting rule. The memory section 14a stores data defining a basic diagram selecting rule necessary for processing by the basic diagram selecting section 14. The basic diagram selecting rule is for selecting the basic diagram corresponding to the format of various kinds of cards.

A sheet arranging section 15 arranges sheets for various kinds of cards in accordance with a sheet arranging rule. That is, the sheet arranging section 15 determines the order in which the basic diagram selected by the basic diagram selecting section 14, together with a later-described associated diagram, is created on a sheet. A memory section 15a stores data defining a sheet arranging rule necessary for processing by the sheet arranging section 15. The sheet arranging rule is for deciding the order of cards in a card format to be arranged.

The sheet number setting section 16 sets a sheet number for the basic diagram and associated diagram in accordance with the sheet number setting rule. A memory section 16a stores data defining the sheet number setting rule necessary for processing by the sheet number setting section 16. The sheet number setting rule is for attaching the sheet number to the respective sheet.

A circuit diagram deciding section 17 decides a circuit diagram corresponding to the respective sheet and associated circuit components in accordance with a circuit diagram deciding rule. A memory section 17a stores data defining a circuit diagram deciding rule necessary for processing by the circuit diagram deciding section 17. The circuit diagram deciding rule is for deciding a circuit diagram drawn on the respective sheet and associated circuit component parts.

A diagram creation executing section 18 decides the diagram creation contents of the respective circuit diagram in accordance with a diagram creation content deciding rule and executes the diagram creation with the use of the circuit component part data. The diagram creation execution section 18 stores the executed diagram creation contents in a memory section 11. Here, the diagram creation is intended to mean the creation of the diagram creation information in data form, not the actual diagram of a line diagram, etc., on a sheet. A memory section 18a stores data for defining a diagram creation content deciding rule necessary for the drawing creation execution section 18 to decide the diagram creation contents. Further, the memory section 18b stores circuit component part data necessary to create the diagram.

Apart from the above basic program, an assorted diagram selecting section 19 selects the associated diagram(for example, a power supply circuit diagram, explanatory diagram, etc.) from the signal contents for each sheet for which the data has been sorted. A memory section 19a stores data defining an associated diagram selecting rule necessary for the associated diagram selecting section 19 to select the associated diagram.

An associated drawing collecting section 20 reads out the data corresponding to the selected associated diagram and collects the data of the associated diagram. The associated diagram collecting section 20 stores the collected associated diagram data. A memory section 20a stores the data of various kinds of associated diagrams.

The operation of the schematic diagram creating system will be explained below.

Every associated input and output signals are written on the input/output signal specification data. The data above is the contents decided, as an upstream specification, through personal contact with the customer, etc., that is, the contents representing how any specific signal be input from any specific card in any specific state to any specific device, or output, but not the contents from which the schematic diagram is directly created.

When input/output signal specification data is input to the schematic diagram creation section 1, input/output signal specification data is sorted, for each card, to the data sorting section 13. Then the basic diagram corresponding to the input/output signal specification data sorted for each card is selected by the basic diagram selecting section 14. On the other hand, a diagram associated with the basic diagram is selected by an associated diagram selecting section 19.

The associated diagram selected by the associated diagram selecting section 19 and basic diagram selected by the basic diagram selecting section 14 are arranged, sheet by sheet, by the sheet arranging section 15. The order of arranging these sheets at this time is based on the type of cards. The assorted diagram is arranged, for example, after the basic diagram. At this time, the number of all the diagram sheets becomes clear.

Then the sheet numbers are attached by the sheet number setting section to the arranged basic and associated diagrams. Where the types of devices corresponding to the arranged basic diagrams are changed in accordance with the order of sheet numbers, a predetermined number of blank sheets are prepared before the corresponding changed basic diagram.

According to the processing up to this time, the contents of the input/output signal specification data corresponding to one sheet of the basic diagram and the sheet number are determined. However, no detailed contents are yet created in the basic diagram.

The contents of the circuit diagram to be drawn are decided by the circuit diagram deciding section 17 on the basis of the individual input/output signal specification data sorted for each sheet. That is, the connection relation and devices(circuit component parts) are determined by checking the device numbers, device symbols, types of devices, kinds of devices, kinds of contacts, etc., of the input/output destinations of respective input and output signals with reference to the input/output signal specification data. Where a signal, that is, a target of determination is input from a limit switch and the kind of its contact is of a normally open type, it is decided to the effect that the limit switch of an "a" contact be drawn as a circuit component part. Further, if the signal is supplied from an external side, it is decided to the effect that a circuit diagram of interconnection information containing a terminal base indicative of an external apparatus be drawn.

A result of determination by the circuit diagram deciding section 17 is passed to a drawing creation executing section 18 and a circuit diagram having a symbol corresponding to the limit switch of an "a" contact is drawn on the basic diagram by the diagram creation executing section 18. At this time, those not to be described on the input/output signal specification data, such as the drawing title and line number, are also drawn. For example, the position coordinate on the diagram at an input or an output section on an input/output signal processing card designated by the input/output signal specification data is derived and the line number is drawn based on the position coordinate.

Predetermined associated diagram data is added by the associated diagram collecting section 20 to the respective associated diagram to which the sheet number is attached by the sheet number setting section 16. In this case, the associated diagram data is, for example, the diagram title and it is read out from the memory section 20a. The associated diagram to be combined with the drawn circuit diagram is collected by the associated diagram collecting section 20.

The circuit diagram drawn by the diagram creation executing section 18 and the collected associated diagram are combined in accordance with the order shown by the sheet number and stored, as the schematic diagram data, in the memory 11. The schematic diagram data is output, by a printer, etc., as one set of schematic diagrams.

Figure 2:
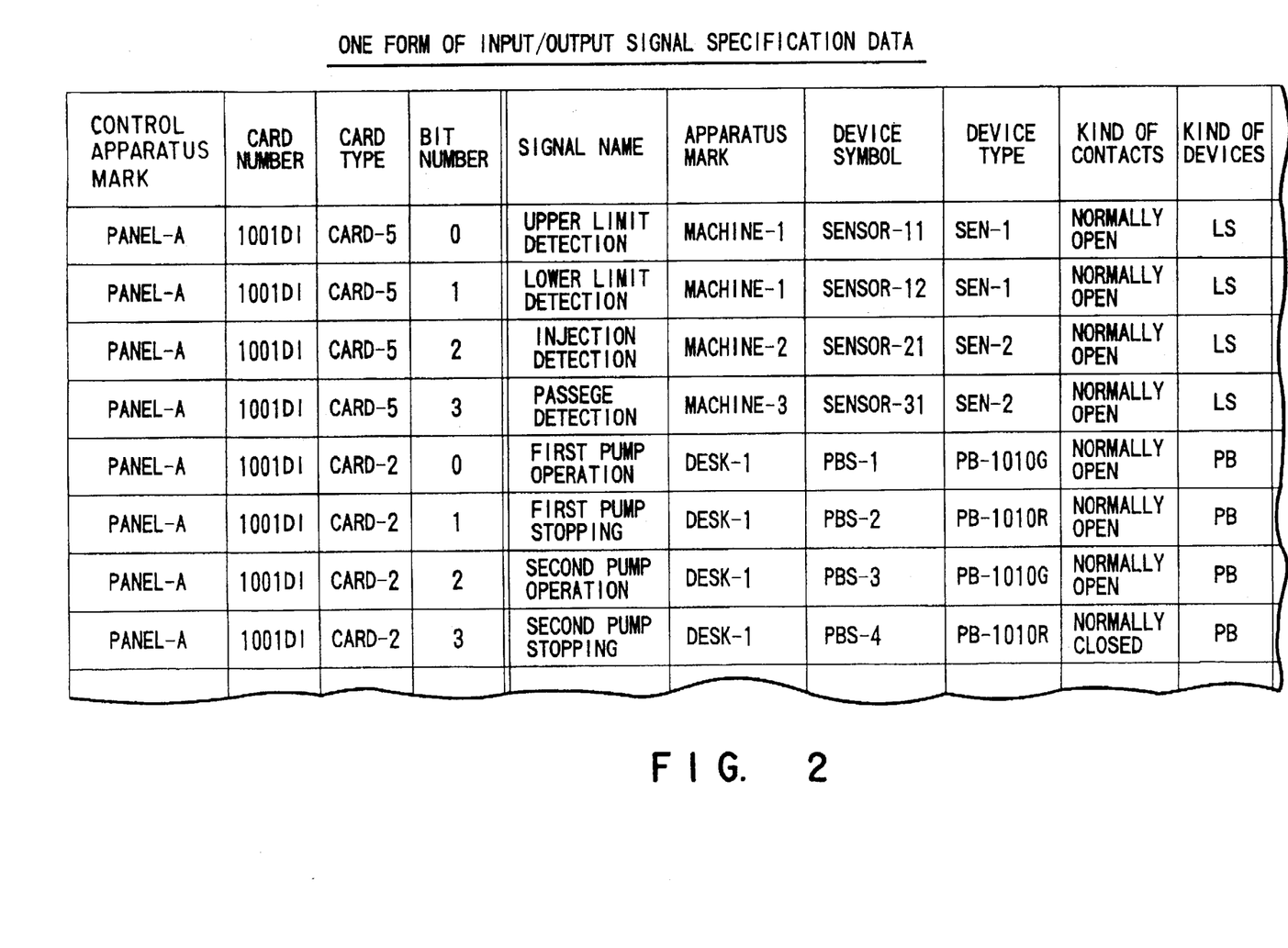
FIG. 2 is a table showing one form of input/output signal specification data used in the schematic diagram creating system shown in FIG. 1.

FIG. 2 shows a table of a detailed form of the input/output signal specification data. As shown in FIG. 2, the input/output signal specification data is such that an input/output relation between various kinds of cards(various devices) in a control apparatus and various kinds of devices in an external or internal apparatus is shown as a list in signal units.

The data on the cards in the control apparatus is shown to the left side of a thick-line frame and the signal data relating to the external or internal apparatus and input to, or output from, the cards are shown to the right side of a thick-line frame. The receiving destination apparatus marks show that of a control apparatus(a control panel held with cards) as a target of the schematic diagram. The "card mark" shows that of any given one of various kinds of cards mounted in the control apparatus. The "type of cards" shows the type of the above-mentioned cards. The "bit number" shows the terminal number attached to the cards in units of signals. The "signal name" shows the name of a signal passing through the bit number. The "apparatus mark" shows the mark of the external apparatus of the signal input/output destination. The "device symbol" shows the symbol of any given one of a plurality of devices mounted on the external apparatus. The "device type" shows the above-mentioned device type. The "kind of contacts" shows the kind of contacts of the above-mentioned device. The "kind of devices" shows the kind of the above-mentioned devices.

For example, the first row data in the table shows that, upon the closure of a limit switch "SENSOR-11" in the external apparatus "MACHINE-1", an upper limit detection signal from that limit switch is input to a bit number "0" of a card "1001DI" in a control apparatus "PANEL-A". Further, the "DI" in the "card mark" means a digital input and the "LS" in the "kind of device" means a limit switch and the "PB" there, a push button.

The rules used in various kinds of processing 13 to 18 will be explained below by way of example.

Figure 3:
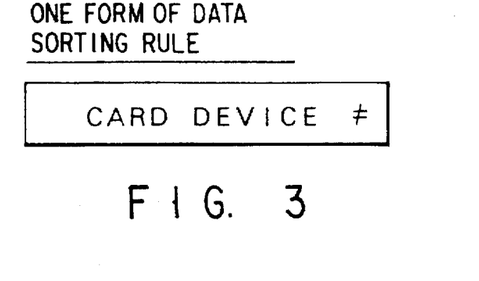
FIG. 3 is a view for showing an example of a data sorting rule used for processing by a data sorting section in the schematic diagram creating system shown in FIG. 1.

FIG. 3 shows an example of the data sorting rule used in the processing by the data sorting section 13. According to the data sorting rule, each of the input/output signal specification data is sorted in units of a card. In this case, the card marks in the input/output signal specification data are sequentially read out downward from above. The "card device ≠" means the inputting of a marker when a sequentially read card mark is changed. The card mark is such that a different mark is allocated to each card. As in the above case, the input/output signal specification data can be sorted using the card mark as a mark.

Figure 4:
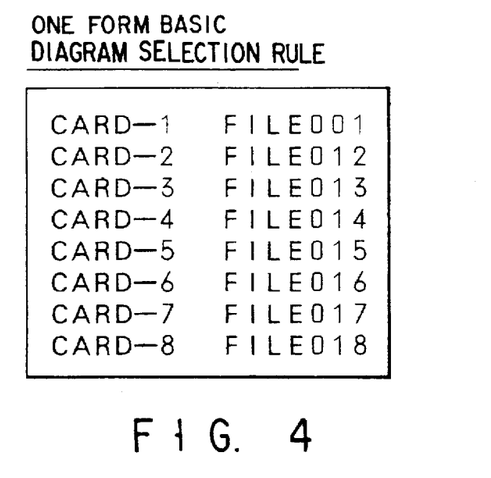
FIG. 4 is a view showing an example of a basic drawing selecting rule used for processing by a basic drawing selecting section in the schematic diagram creating system shown in FIG. 1.

FIG. 4 is a diagram showing an example of the basic diagram selecting rule used for processing by the basic diagram selecting section 14. The basic diagram selecting rule enables the selection of the basic drawing of a card corresponding to the sorted input/output signal specification data. In this case, the card type in the input/output signal specification data is sequentially read out downward from above. The "CARD-1 FILE011" means that the symbol corresponding to the card of the type "CARD-1" is obtained by reading out "FILE011". It is to be noted that, for the same type of cards, the same diagram is used.

Figure 5:
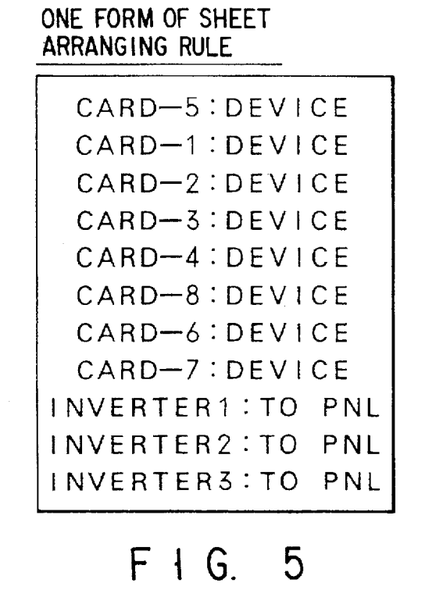
FIG. 5 is a view showing an example of a sheet arranging rule used for processing by a sheet arranging section in the schematic diagram creating system shown in FIG. 1.

FIG. 5 is a diagram showing an example of the sheet arranging rule used for processing by the sheet arranging section 15. The sheet arranging rule enables the sorted input/output signal specification data to be arranged in a predetermined order. In this case, the order of the type of cards to be arranged is determined in accordance with the rule. The "CARD-5" to "CARD-7" means the order of the type of cards to be arranged. It is to be noted that the "DEVICE" means that, for a plurality of input/output signal specification data corresponding to the same type, arrangement is done in an ascending order.

On the other hand the "INVERTER1" to "INVERTER3" means the order of the type of external apparatuses to be arranged for those sheets obtained through the selection of those associated diagrams. The "TO PNL" means that, for a plurality of data(diagrams) corresponding to the same type, arrangement is made in an ascending order of the device marks.

As shown in FIG. 5, the data corresponding to the associated diagrams are arranged behind the input/output signal specification data corresponding to the basic diagram.

Figure 6:
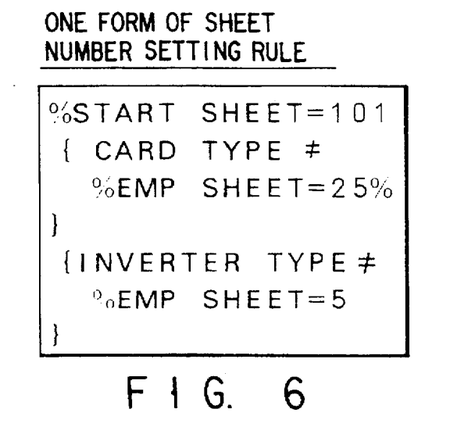
FIG. 6 is a view showing an example of a sheet number setting rule used for processing by a sheet number setting section in the schematic diagram creating system shown in FIG. 1.

FIG. 6 is a diagram showing an example of a sheet number setting rule used for processing by the sheet number setting section 16. According to the sheet number setting rule, a sheet number is allocated to each of arranged input/output signal specification data. The "%START SHEET= 101" in FIG. 6 means that, for the arranged input/output signal specification, consecutive numbers are attached from the "101". The "CARD TYPE ≠" and "%EMP SHEET= 25%" means that it secures blank sheets corresponding to 25% of those sheets which, upon change in card type, are attached for the same type of cards immediately before that time. Further, the "INVERTER TYPE≠" and "%EMP SHEET=5" mean securing blank sheets corresponding to five sheets where the inverter type is changed.

Figure 7:
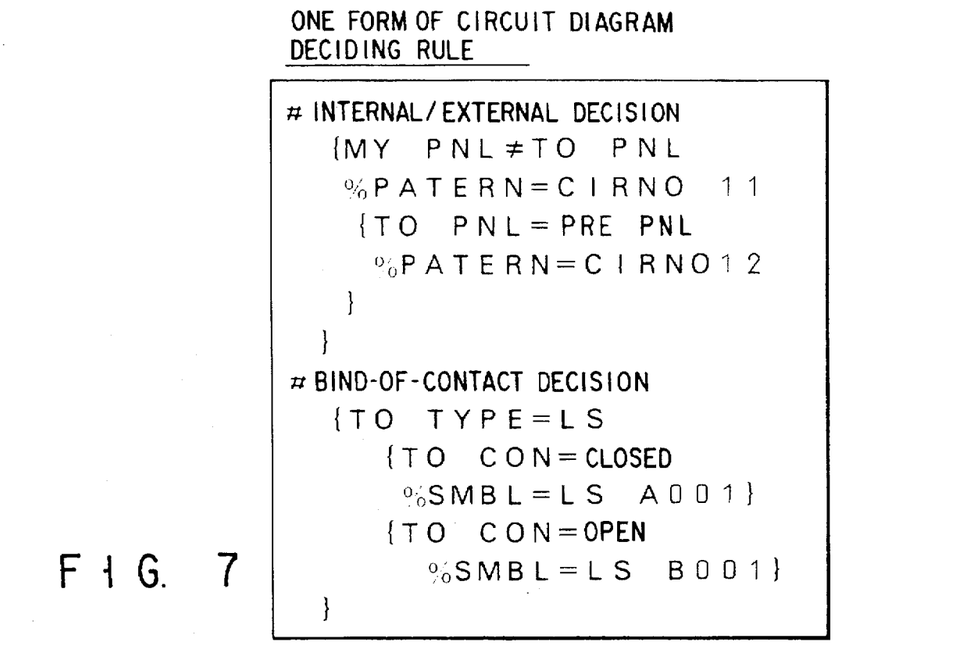
FIG. 7 is a view showing an example of a circuit diagram deciding rule used for processing by a circuit diagram deciding section in the schematic diagram creating system shown in FIG. 1.

FIG. 7 is a diagram showing an example of the circuit diagram deciding rule used for processing by the circuit diagram deciding section 17. The circuit diagram deciding rule enables an internal/external decision. That is, the connection relation between the card and the external apparatus is derived based on the apparatus mark in the respective input/output signal specification data. "MY PNL≠TO PNL" and "%PATTERN=CIRN011" in FIG. 7 mean that, if a given signal line in the control apparatus is connected to an external apparatus, a circuit component part corresponding to the circuit number 11 is selected. The "TO PNL=PRE PNL" and "%PATTERN=CIRN112" mean selecting a circuit component part corresponding to a circuit number 12 in the case where the connection destination of a given signal line in the control apparatus is found the same as an external apparatus decided immediately before it.

Further, the above-mentioned circuit diagram deciding rule enables the making of a kind-of-key decision. That is, the symbol of the external apparatus is derived based on the apparatus type and kind of contact in the respective input/output signal specification data. The "TO TYPE=LS", "TO CON=closed" and "%SMBL=LS A001" in FIG. 7 mean selecting a circuit component part corresponding to the number A001 as the symbol of the "a" contact in the case where, when the device type is a limit switch(LS), the kind of contact is "normally open". Further, the "%SMBL=LS B001" means selecting a circuit component part corresponding to the number B001 as a symbol of a "b", contact.

Figure 8:
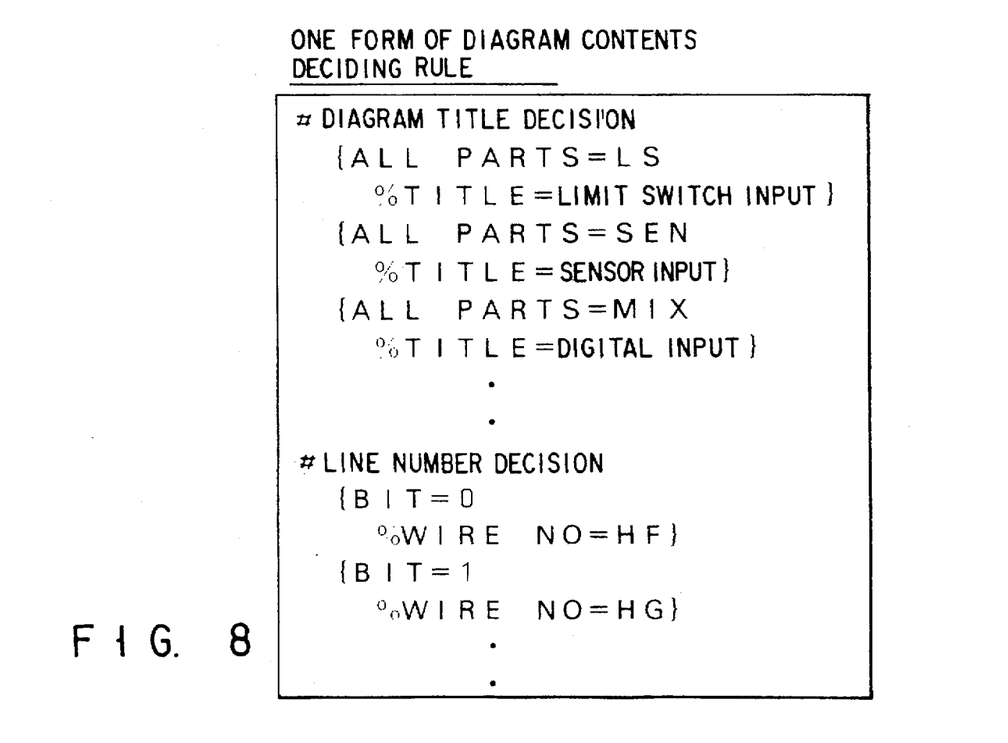
FIG. 8 is a view showing an example of a drawing contents deciding rule used for processing by a drawing contents deciding section in the schematic diagram creating system shown in FIG. 1.

FIG. 8 is a diagram showing an example of a diagram contents deciding rule used for processing by the diagram creation executing section 18. The diagram creation deciding rule enables the making of the drawing title decision. That is, the drawing title is decided based on the "kind of device" in the input/output signal specification data. The "ALL PARTS=LS" and "%TITLE=LIMIT SWITCH INPUT" in FIG. 8 mean deciding from which device a corresponding input/output signal comes for each sheet and, in the case where the signal is a signal only from the limit switch(LS), deciding the diagram title as being a "LIMIT SWITCH INPUT". Further, the "ALL PARTS=SEN" and "%TITLE=SENSOR INPUT" mean deciding the diagram title as being a "SENSOR INPUT" in the case where the signal is a signal only from the sensor input(SEN). The "ALL PARTS=MIX" and "%TITLE=DIGITAL INPUT" means deciding the diagram title as being "DIGITAL INPUT" in the case where a plurality of different kinds are mixed there.

The diagram creation contents deciding rule enables the making of a line number decision. That is, the line number is decided based on the bit number in the respective input/output signal specification data. The "BIT=0" and "WIRE NO=HF" mean deciding the line number as being "HF" if the signal is a signal entered at a 0 bit time.

Based on the input/output signal specification data it is possible to create a diagram using various data required as a circuit diagram.

Figure 9:
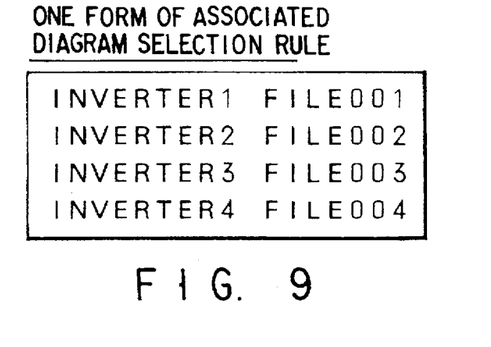
FIG. 9 is a view showing an example of an associated drawing selecting rule used for processing by an associated drawing selecting section in the schematic diagram shown in FIG. 1.

FIG. 9 is a diagram showing an example of the assorted diagram selecting rule used for processing by the associated diagram selecting section 19. Based on the device type in the respective input/output signal specification data, the diagram name of a corresponding associated diagram is selected in accordance with the associated diagram selecting rule. The "INVERTER1 FILE001" in FIG. 8 means reading out, from the file "FILE001", the diagram name of the associated diagram corresponding to the device type "INVERTER".

Figure 10:
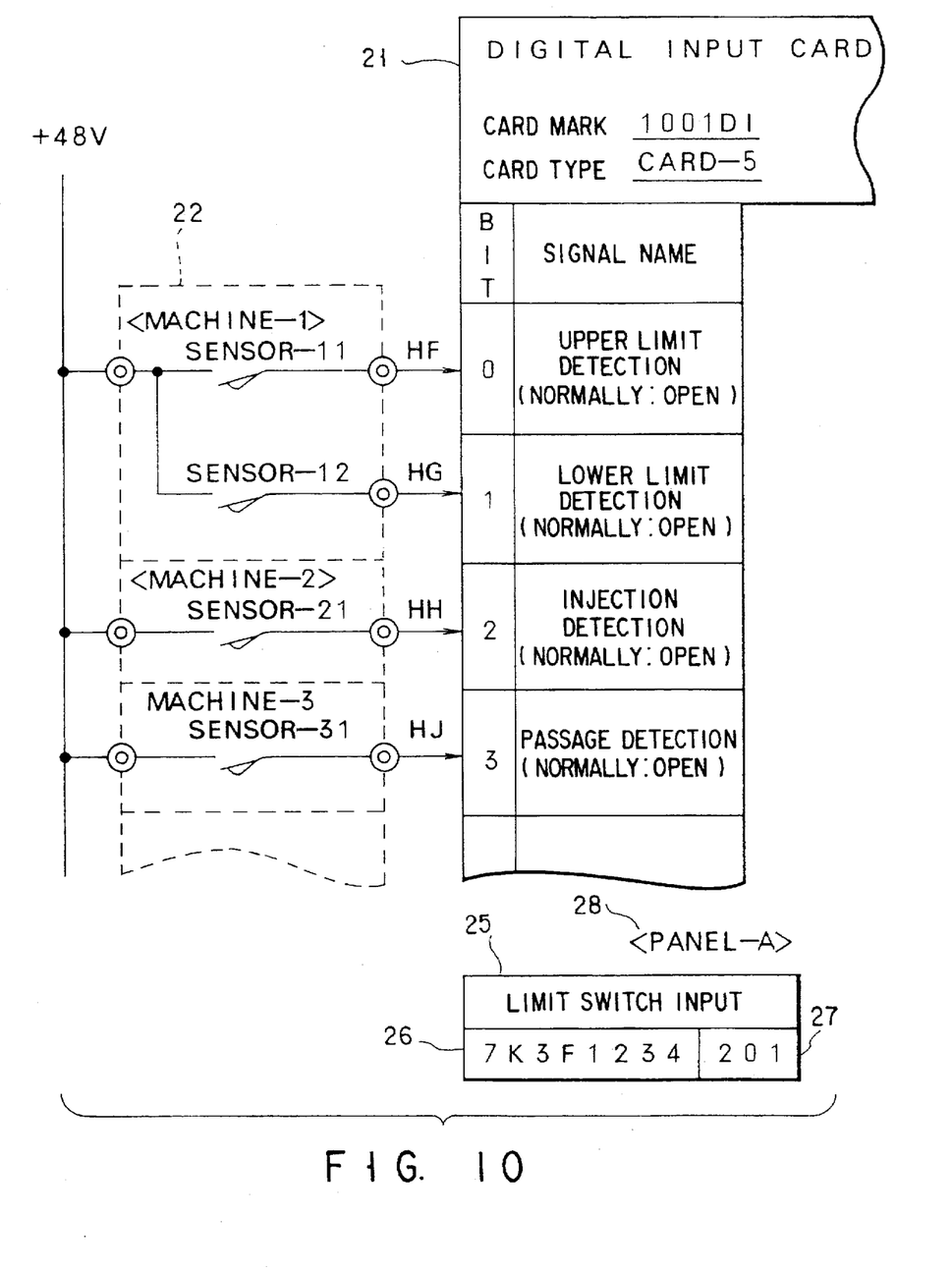
FIG. 10 is a circuit diagram showing contents on one of a set of schematic diagrams created by the schematic diagram creating system shown in FIG. 1.

FIG. 10 is a circuit diagram showing the contents on one sheet of one set of schematic diagrams created by the schematic diagram creating system. The example of FIG. 10 shows diagram contents based on first to fourth data of those input/output signal specification data written on FIG. 2.

The written contents 21 are those relating to the card in the control apparatus. In this case, the name of the card corresponds to a "DIGITAL INPUT CARD", the card mark to a "111001DI" and the card type to a "CARD-5". On the other hand, the written contents 22 correspond to those relating to a device in the external apparatus. In this case, limit switches "SENSOR-11" and "SENSOR-12" in the external apparatus "MACHINE-1" are written as the symbols of an "a" contact. Further, a limit switch "SENSOR-21" in the external apparatus "MACHINE-2" and limit switch "SENSOR-31" in the external apparatus "MACHINE-3" are described each with a symbol of an "a" contact.

In an example of FIG. 10, the marks "MACHINE-1" to "MACHINE-3" being input signal destination apparatuses and mark "PANEL-A" of the input signal processing-side apparatus are different and a terminal panel representing a connection from an outside is written together with a boundary line.

Further, the "LIMIT SWITCH INPUT" is written as a diagram title 25, the "7K3F1234", as a number 26 of a schematic diagram and the "201", as a sheet number 27 and the apparatus "PANEL-A" is written. And the line numbers "HF" to "HJ" are written.

In the schematic diagram of the present embodiment, through the inputting of the input/output signal specification data, the data are automatically sorted into a plurality of sheets, followed by the arranging of the sheets, the setting of the sheet numbers, the deciding of the circuit diagrams and the executing of the drawing creation. Through this series of processing it is possible to prepare a plurality of circuits diagrams. By doing so, it is possible to automatically and efficiently create schematic diagrams with the least need of human intervention.

The present invention is not restricted to the above-mentioned embodiments and various changes or modifications can be made according to the present invention. Although, in the above-mentioned embodiment, the cards have been used as the devices in the control apparatuses, other devices such as modules and units can be used instead.

Although, in the above-mentioned embodiment, the input/output relation has been shown in a one-card-per-sheet basis by way of example, it can be shown with a plurality of sheets per card and with a plurality of cards per sheet by defining corresponding rules.

INDUSTRIAL APPLICABILITY

According to the present invention, schematic diagrams are automatically created, against given input/output signal specification data in accordance with predetermined rules and it is possible to simply and rapidly create the schematic diagrams, uniformly, over a whole range. Further, it is also possible to efficiently create schematic diagrams with less human intervention.

According to the present invention, a diagram creation executing section creates, on circuit diagrams, additional diagram creation contents, such as the diagram titles and line numbers, from input/output signals for input/output signal specification data and diagram creation contents, the additional diagram creation contents being not written on the input/output signal specification data. It is thus possible to automatically create more detailed schematic diagrams.

According to the present invention it is possible to, with respect to given input/output signal specification data, selectively collect circuit diagrams associated with basic circuit diagrams in accordance with predetermined rules and add associated diagrams having diagram creation contents, etc., comprising circuit diagrams and comments such as signal names and device symbols and, by doing so, it is possible to automatically create schematic diagrams of more substantial contents.

I claim:

1. A schematic diagram creating system for creating schematic diagrams associated with a control apparatus on the basis of a plurality of specification data with an input/output relation between each kind of card in the control apparatus and each kind of device in an external or internal apparatus being listed in signal units, the system comprising:

sorting means for sorting, in accordance with a data sorting rule, the specification data in card units;

basic diagram selecting means for selecting, in accordance with a basic diagram selecting rule, basic diagram data corresponding to the specification data for each card sorted by the sorting means;

arranging means for arranging, in accordance with a sheet arranging rule, the specification data for each card sorted by the sorting means;

sheet number setting means for attaching, in accordance with a sheet number setting rule, a sheet number to the corresponding specification data for each card sorted by the sorting, means;

deciding means for deciding, in accordance with a circuit diagram deciding rule, a circuit diagram corresponding to a respective sheet; and diagram creation executing means for executing diagram creation of the circuit diagram based on the basic diagram data for each card.

2. The system according to claim 1, wherein the diagram creation executing means includes means for drawing character information on the basic diagram data at predetermined places.

3. The system according to claim 2, wherein the drawing creation executing means includes means for drawing a diagram title on the basic drawing at predetermined places.

4. The system according to claim 2, wherein the diagram creation executing means includes means for drawing line numbers on the basic diagram at predetermined places.

5. The system according to claim 1, wherein the sheet number setting means includes means for attaching consecutive sheet numbers to the specification data in an order in which the specification data are arranged by the arranging means.

6. The system according to claim 5, wherein the sheet number setting means for, when the type of cards corresponding to the specification data arranged by the arranging means is changed, securing blank sheet numbers and then attaching the following sheet numbers.

7. The system according to claim 1, wherein the arranging means includes means for storing data for defining an arranging order.

8. A schematic diagram creating system for creating schematic diagrams associated with a control apparatus on the basis of a plurality of specification data with an input/output relation between each kind of card in the control apparatus and each kind of device in an external or internal apparatus being listed in signal units, the system comprising:

sorting means for sorting in accordance with a data sorting rule, the specification data in card units;

basic diagram selecting means for selecting, in accordance with a basic diagram selecting rule basic diagram data corresponding to the specification data for each card sorted by the sorting means;

associated diagram selecting means for selecting in accordance with an associated diagram selecting rule, associated diagram data associated with the basic diagram data;

arranging means for arranging, in accordance with a sheet arranging rule, the specification data for each card sorted by the sorting means and associated diagram data;

sheet number setting means for attaching in accordance with a sheet number setting rule, a sheet number to the corresponding specification data arranged by the arranging means and associated diagram data;

deciding means for deciding in accordance with a circuit diagram deciding rule, a circuit diagram corresponding to a respective sheet;

diagram creation executing means for executing diagram creation of the circuit diagram based on the basic diagram data for each card; and means for creating predetermined data on the associated diagram data.

* * * * *

UNITED STATES PATENT AND TRADEMARK OFFICE
CERTIFICATE OF CORRECTION

PATENT NO.    : 5,751,912
DATED         : May 12, 1998
INVENTOR(S)   : Yasuhito KAROUJI It is certified that error appears in the above-indentified patent and that said Letters Patent is hereby corrected as shown below:

Claim 1, Col. 11, line 20, after "sorting", delete ",".

Claim 8, Col. 12, line 15, after "sorting" (second occurrence), insert --,--.

Claim 8, Col. 12, line 18, after "rule", insert --,--.

Claim 8, Col. 12, line 21, after "selecting", insert --,--.

Claim 8, Col. 12, line 29, after "attaching", insert --,--.

Claim 8, Col. 12, line 33, after "deciding" (second occurrence), insert --,--.

Signed and Sealed this

Twenty-second Day of June, 1999

Attest:

Q. TODD DICKINSON

*Attesting Officer*     Acting Commissioner of Patents and Trademarks